(12) United States Patent
Hansen et al.

(10) Patent No.: US 7,214,906 B1
(45) Date of Patent: May 8, 2007

(54) HEATED HAND GRIP CONTROL

(76) Inventors: K Brent Hansen, 34 Forbes Ave., San Anselmo, CA (US) 94960; Michael Rodney Pollard, 5931 Greenridge Rd., Castro Valley, CA (US) 94552

( * ) Notice: Subject to any disclaimer, the term of this patent is extended or adjusted under 35 U.S.C. 154(b) by 241 days.

(21) Appl. No.: 11/083,385

(22) Filed: Mar. 16, 2005

(51) Int. Cl.
*H05B 1/02* (2006.01)

(52) U.S. Cl. .................... 219/204; 219/494; 219/504

(58) Field of Classification Search ............ 219/204, 219/494, 504, 540, 544, 202, 530; 74/551.9
See application file for complete search history.

(56) References Cited

U.S. PATENT DOCUMENTS

| | | | |
|---|---|---|---|
| 5,613,407 A * | 3/1997 | Ogata | 74/551.9 |
| 6,114,668 A * | 9/2000 | Ogata et al. | 219/494 |
| 6,844,524 B2 * | 1/2005 | Downey et al. | 219/204 |
| 6,900,411 B2 * | 5/2005 | Norton et al. | 219/209 |
| 6,903,312 B2 * | 6/2005 | Miura et al. | 219/506 |
| 6,927,367 B2 * | 8/2005 | Livingstone | 219/490 |
| 6,927,368 B2 * | 8/2005 | Cao et al. | 219/492 |
| 6,984,807 B2 * | 1/2006 | Richlen | 219/204 |
| 7,064,292 B1 * | 6/2006 | Oishi et al. | 219/204 |
| 2006/0049161 A1 * | 3/2006 | Richlen | 219/204 |

FOREIGN PATENT DOCUMENTS

DE   10048181 A1 *   4/2002

* cited by examiner

*Primary Examiner*—Robin Evans
*Assistant Examiner*—Vinod Patel
(74) *Attorney, Agent, or Firm*—Risto A. Rinne, Jr.

(57) ABSTRACT

An apparatus for the independent control of the amount of heat produced by a right and a left side heated hand grip includes a control panel with various input buttons and a pair of LEDS that each indicates a relative power setting of one of the heated hand grips. A microprocessor receives input instructions from the input buttons and provides a first pulsed DC output having a desired duty cycle to one of the heated hand grips and a second pulsed DC output having either the same or a different duty cycle to a remaining one of the heated hand grips, thereby controlling the amount of heat produced by each respective heated hand grip. This improves comfort. Reverse polarity protection, a return to previous power settings, including a remembrance of a differential between the two heated hand grips, and automatic shutoff when battery voltage reaches a predetermined value are described.

34 Claims, 7 Drawing Sheets

HEATED HAND GRIP CONTROL

BACKGROUND OF THE INVENTION

1. Field of the Invention

The present invention, in general, relates to hand grips, such as are found on the handlebars of motorcycles, snowmobiles, etc. and, more particularly, to heated types of handlebar hand grips.

Devices that require two hands to grip each side of a handlebar are well-known and include all manner of machines, including but not limited to bicycles, motorcycles, snowmobiles, and even yard tools, such as snow blowers and garden roto-tillers.

Often, the hands get cold when grasping the handlebars on certain of these types of devices. Accordingly, heated handlebar hand grips have been invented to help ameliorate cold hands when, for example, a person is driving a motorcycle on a chilly day.

At best, current heated grips include two positions, a low heat and a high heat position. Both hand grips (i.e., simultaneously both the right and left sides of the handlebars) are then set to produce the same amount of heat. While certainly better than nothing, these types of devices do not provide the degree of control or regulation that is necessary to maintain the hands at an optimum temperature.

There is, at times, a need to supply a different amount of thermal energy to one side of a handlebar grip than to the opposite side. This can be a function of the control levers that each hand may, at times, be required to operate. It may also be a function of the type of grip that is required on each side of the handlebars, where a firmer grip is required on one side and a less firm grip is required on the other side. Or, one side may offer greater protection from the wind than the other.

For example on a motorcycle, the right hand operates a rotary throttle. As such, the right hand wraps around the throttle control, squeezing and rotating it as required. This position is maintained for the majority of time, changing only on rare occasion when a front brake is applied. Otherwise, the grip around the throttle ensures ample area for contact between the right hand and the heated throttle grip. A large area for physical contact between the hand and the right side heated grip provides good thermal transfer of heat energy from the heated throttle grip to the right hand.

However, the left hand is also used to operate the clutch lever which is used during each successive gear change, whether increasing or decreasing the gear ratio. Many riders constantly maintain some or all of the fingers of their left hand in contact with the clutch lever, extending the fingers away from the left side grip. The clutch lever is not heated. The extended fingers, rather than absorbing heat from the grip, are now exposed to ambient air where they release what little thermal energy they may have to the ambient air. Only a small portion of the palm of the hand remains in constant contact with the heated left side handlebar grip, where heat can be absorbed.

Accordingly, when the same amount of heat energy is applied to both the right and left hand sides of a motorcycle handlebar, the left hand will often feel colder than the right. If the heat setting for both sides is set to its highest setting sufficient to heat the left hand, then the right hand often becomes too hot.

A similar uneven heating and cooling situation occurs whenever a chilly crosswind is removing heat from an exposed hand faster than from a downwind hand that is shielded from the wind.

Additionally, the heat setting for current devices requires the operator to remember to turn it off, lest it come on again the next time the machine i.e., the motorcycle, is used. This is undesirable for at least two reasons. First, heating may not be required the next time the machine is used. If the heated handlebar grips were turned and left on for a chilly evening ride home and then the next ride occurs on a following warm sunny afternoon, heat will not be required. Unless the operator remembers to turn the heat off after his or her ride, it will automatically resume again the next time the motorcycle is used.

Second, leaving the hand grips in a heated "on" position when heat is not required imposes a needless drain on the battery. The charging system must compensate for that drain and the ultimate source of that energy is the fuel that is consumed by the engine. Accordingly, fuel economy is compromised.

There is another related need that previous heated handlebar grips have not addressed. As mentioned above, there is a natural differential in the amount of thermal energy that is typically required between a right and left hand due to the normal position of the hand. If a left and a right side could be adjusted for a difference in temperature that felt comfortable at a particular ambient temperature, when the ambient temperature rises or falls, it is desirable to be able to increase or decrease the heat that is applied while still preserving the basic differential between the left and right hand sides.

Similarly, if an ideal and typical setting for each side were obtained and the motorcycle (machine) were shut off, it would be desirable for the device to remember and to automatically return to the previous settings for both the right and left hand sides the next time the heated hand grip control is activated. This would ensure that the remembered setting was either the ideal or close to ideal from which one could easily fine tune the previous settings. It would be especially ideal to remember and restore the differential amount between the right and left heated hand grips, as well.

As mentioned above, it is common to forget to turn heated hand grips off at the end of a ride or other type of usage. An automotive type of battery, when fully charged and during charging, will express a voltage that typically is above 12.75 VDC. When the alternator stops supplying electrical power to the battery the voltage begins to drop. Before the battery begins to substantially drain and lose its reserve capacity, it is desirable to sense this condition. It would be ideal for heated grips to automatically shut off when the battery voltage drops to about 12.75 volts.

This capability would provide the expected benefit of not draining the battery when the motorcycle (machine) was not in use. It would also provide the unexpected benefit of preventing use of the heated handlebar grips when a defect in the vehicle's charging system is occurring.

Under such a failure condition, the battery would not be properly charged by the alternator during normal use and it would begin to lose its charge. Once its output voltage fell below a predetermined level (12.75 volts), the heated hand grip control would, ideally, cease to operate.

This would reduce current drain on the battery which in turn would extend the distance that the vehicle could be used (driven). It would also alert the operator by tactile feedback to the fact that an electrical failure is occurring. The operator would sense the cooling hands and a lack of indicator lights on a control panel of the heated handlebar grips, which would inform the operator that an electrical failure was occurring. The operator would then hasten home or to a repair facility. The operator might not notice the illumination of a battery charging warning light in the vehicle's instrument cluster when the electrical failure occurred because the operator might be concentrating on road conditions, however, the resultant chilly hands would soon attract his or her attention.

It is also desirable to provide ease in adjusting the left and right hand sides to produce the desired level of heat output as well as to provide a visual indication of the relative settings of each side.

Accordingly, there exists today a need for a heated hand grip control that helps ameliorate the above-mentioned problems and difficulties.

Clearly, such an apparatus would be a useful and desirable device.

2. Description of Prior Art

Heated motorcycle and snowmobile hand grips are, in general, known. While the structural arrangements of the above described devices may, at first appearance, have certain similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an object of the present invention to provide a heated hand grip control that allows setting a left and a right hand heated handlebar grip to a different setting.

It is also an important object of the invention to provide a heated hand grip control that allows setting a left and a right hand heated handlebar grip to a variety of different settings, thereby providing optimum comfort for the conditions at hand.

Another object of the invention is to provide a heated hand grip control that provides a visual indication of the relative heat settings for a right and a left hand grip.

Still another object of the invention is to provide a heated hand grip control that is adapted to provide an optimum amount of heat to each hand for a given ambient condition.

Still yet another object of the invention is to provide a heated hand grip control that is adapted to automatically shut itself off when a battery voltage falls to a predetermined value.

Yet another important object of the invention is to provide a heated hand grip control that is adapted to remember a previous left and right setting and which, when energized again, returns to the previous settings.

Still yet another important object of the invention is to provide a heated hand grip control that remembers a relative differential that is set between a right and a left hand side and which, when coarsely adjusted either up or down in heat output, automatically maintains that differential.

A first continuing object of the invention is to provide a heated hand grip control that allows for both coarse setting adjustments as well as fine tuning between each coarse setting.

A second continuing object of the invention is to provide a heated hand grip control that includes a microprocessor and a memory or a microcontroller.

A third continuing object of the invention is to provide a heated hand grip control that includes protection for reverse polarity connection.

A fourth continuing object of the invention is to provide a heated hand grip control that includes protection for excessive current (i.e., an overload condition) on each of two output signal lines.

Briefly, a heated hand grip control that is constructed in accordance with the principles of the present invention has a user-accessible control panel conveniently mounted and connected to a microprocessor's (or microcontroller's) input. The control panel includes a course up button that is depressed to raise, in course increments, the overall energy that is supplied to both the right and left hand grips. The control panel includes course down button that is depressed to lower, in course increments, the overall energy that is supplied to both the right and left hand grips. A pair of indicator lights, one for each the right and left hand side grips, progressively change in appearance to provide an indication of the temperature settings for each hand and of the changes made thereto. A left grip button is used to make fine adjustments, intermediate each course adjustment, for the left hand grip. A right grip button is used to similarly make fine adjustments for the right hand grip. The microprocessor responds to the input settings by varying a first pulsed DC output signal to the right hand heated grip and by varying a second pulsed DC output signal to the left hand heated grip. The microprocessor includes a non-volatile memory that remembers the previous settings for both sides and when reactivated, automatically returns to those settings. The microprocessor's memory is also used to remember a differential between the right and left hand sides and when course adjustments to the amount of heat output are made, the microprocessor maintains the differential as the course settings are modified. The microprocessor also preferably senses battery voltage and automatically turns itself either off or enters into a quiescent state when the battery voltage falls to or below a predetermined level.

DETAILED DESCRIPTION OF THE INVENTION

Figure 1:
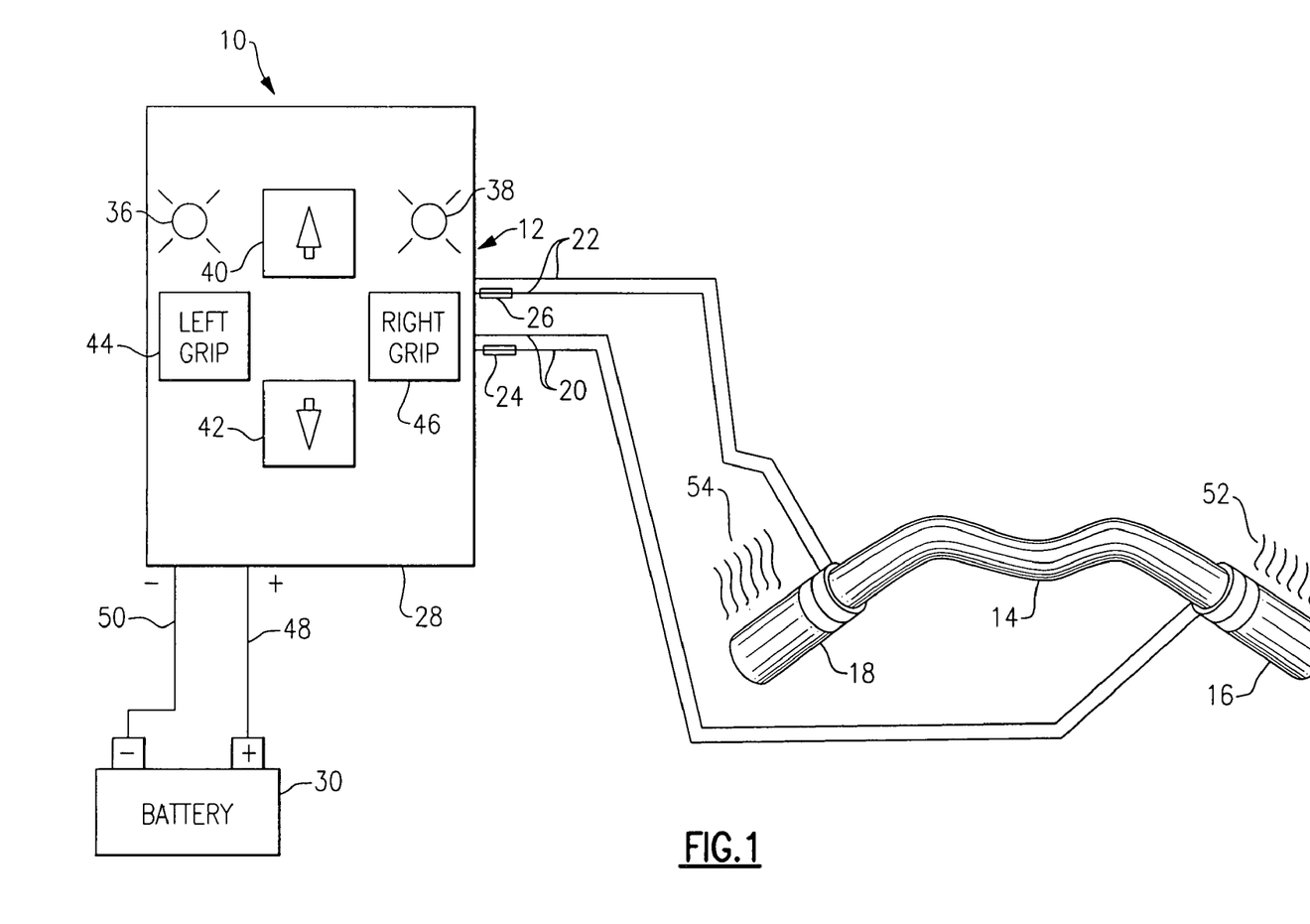
FIG. 1 is a block diagrammatic view of a heated hand grip control and its connection to a pair of heated grips on a handlebar.
Figure 2:
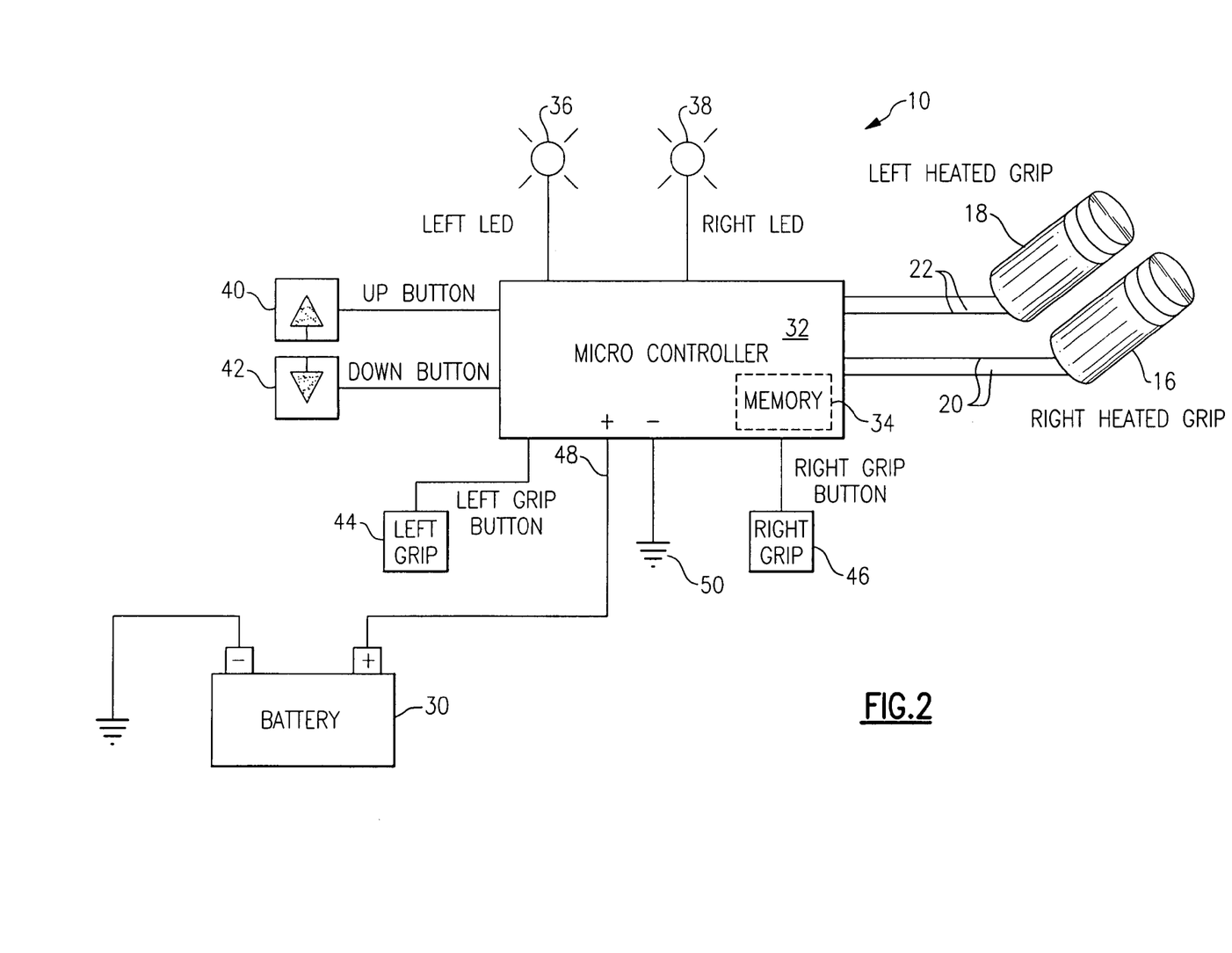
FIG. 2 is a block wiring diagram of the heated hand grip control of FIG. 1.
Figure 3:
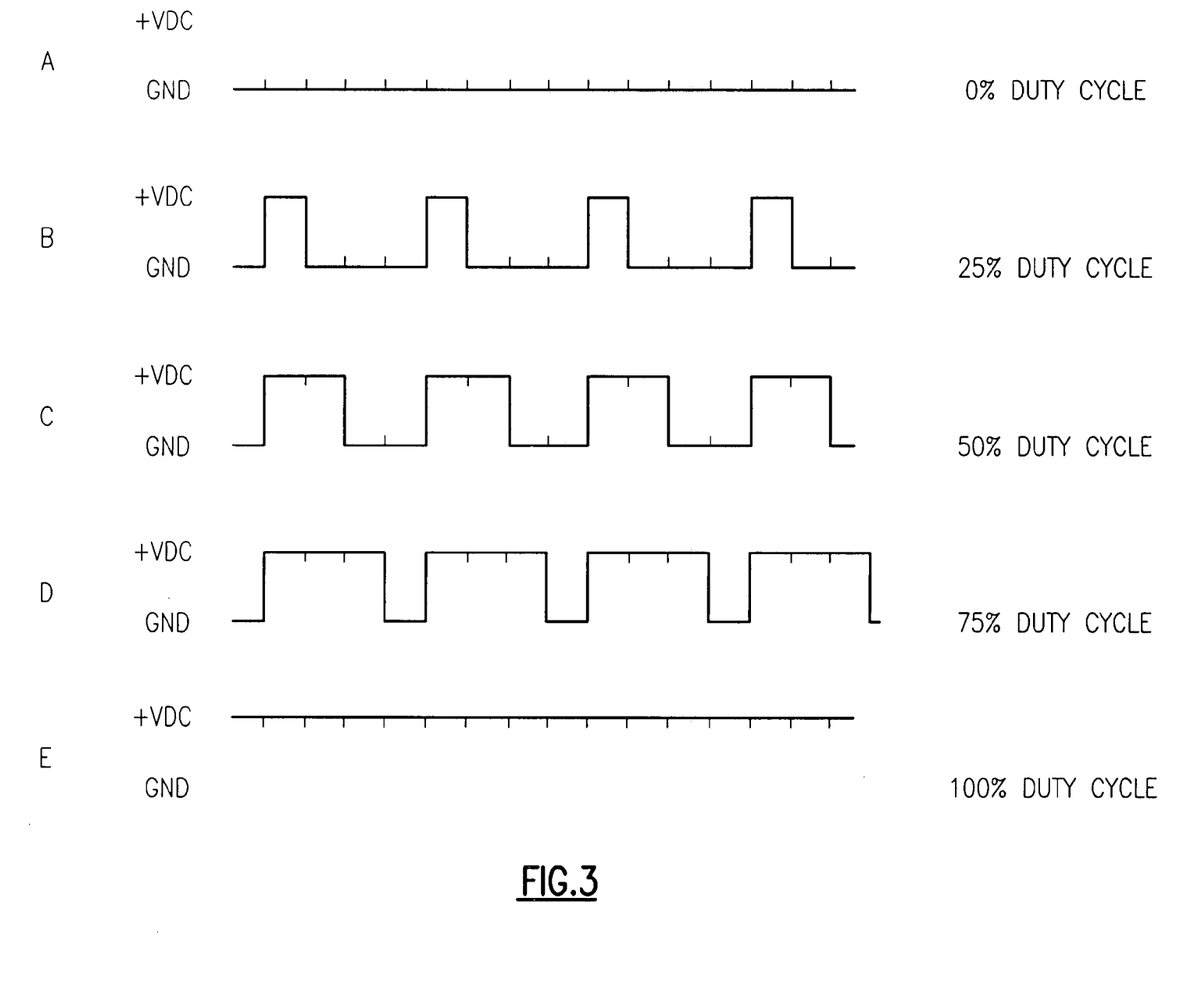
FIG. 3 is a plurality of a few possible waveforms of a pulsed DC output of the heated hand grip control of FIG. 1.

Referring on occasion to FIG. 1 and FIG. 2, is shown, a heated hand grip control, identified in general by the reference numeral 10. Refer also on occasion to FIG. 3 which shows only a few of the many possible outputs of the heated hand grip control 10.

A control panel, identified in general by the reference numeral 12, is conveniently mounted on or near a handlebar 14.

The handlebar 14 includes right side heated hand grip 16 and a left side heated hand grip 18. The heated hand grips 16, 18 are either factory installed, dealer installed, or an aftermarket add on. The heated hand grips 16, 18 includes some resistive means that produces heat in proportion to the electrical energy each heated hand grip 16, 18 receives.

The control panel 12 includes a first pulsed DC output signal 20 that is supplied to the right hand heated grip 16 and a second pulsed DC output signal 22 that is supplied to the left hand heated grip 18. These each include current limiting means 24, 26, such as a fuse to protect against an over current condition, for example, if either of the pulsed outputs 20, 22 were to become shorted.

The control panel 12 preferably includes an enclosure 28, such as a plastic container, inside of which all components, as are described in greater detail hereinafter, are contained. However, if preferred, any of the components may be located remote with respect to the control panel 12.

Typically when factory installed, each of the heated hand grips 16, 18 is grounded on one electrical wire (i.e., lead) side thereof and a remaining electrical wire side is where electrical voltage energy (i.e., positive voltage) is applied. If one lead each of the heated hand grips 16, 18 is not grounded, then both leads are discretely wired, as shown.

When the heated hand grips 16, 18 each include one lead that is grounded, then a corresponding ground lead of each of the pulsed outputs 20, 22 is grounded and a remaining (+VDC out) lead is connected to the "hot" lead of each of the heated hand grips 16, 18, as is well known in the electrical arts.

The control panel 12 is connected to a vehicle 12 VDC battery 30. A microprocessor 32 and a non-volatile memory 34 are included, preferably in the enclosure 28, and are used to receive input and to control the pulsed DC outputs 20, 22 accordingly, as well as to store settings and a differential value in the memory 34. The memory 34 is operatively connected to the microprocessor 32.

The term microprocessor 32, as used herein, is intended to include any type of microprocessor or microcontroller (i.e., a similar type of processor with the memory 34 as an integral part thereof) sufficient to perform the required tasks.

The control panel 12 includes four input control functions that are selected by an operator and a left grip LED 36 and a right grip LED 38, which serve as indicators for the present relative power output settings of the heated hand grip control 10.

The four input controls include a coarse up button 40, a coarse down button 42, a left grip button 44, and a right grip button 46. The four input control buttons 40–46 include any preferred type of pressure switch, membrane switch, or other type of electrical momentary switch.

The four input control buttons 40–46 are used to energize (i.e., turn on) the heated hand grip control 10 as well as to regulate all coarse and fine output controls.

The left grip LED 36 provides a relative indication of the duty cycle of the second pulsed DC output signal 22 that is supplied to the left hand heated grip 18. This is described in greater detail hereinafter. The right grip LED 38 similarly provides a relative indication of the duty cycle supplied to the first pulsed DC output signal 20 that is supplied to the right hand heated grip 16.

A preferred physical layout of the four input buttons 40–46 and of the two LEDs 36, 38 are shown in the control panel 12 of FIG. 1.

Referring now also on occasion to FIG. 3, five possible waveforms A, B, C, D, and E are shown that are supplied along either the first pulsed DC output signal 20 to the right hand heated grip 16 or to the second pulsed DC output signal 22 to the left hand heated grip 18 (or to both simultaneously, if that happens to be preferred). Many other waveforms, not shown, are also possible.

FIG. 3 illustrates how varying the duty cycle from zero percent on duty cycle at A (off entirely) to one-hundred percent on duty cycle at E (on all the time) is possible. A 25% on duty cycle at B, a 50% on duty cycle at C, and a 75% on duty cycle at D are also shown.

As illustrated, waveform C supplies twice the electrical energy to the corresponding heated grip (either 16 or 18) that it is connected to than would waveform B. Similarly, waveform D supplies three times the electrical energy of waveform B. Waveform E supplies four times the electrical energy of waveform B. Waveform E supplies twice as much electrical energy as waveform C.

There is considerable design variability as to the number of possible waveforms possible as outputs for the pulsed DC output signals 20, 22 that are supplied to the heated hand grips 16, 18.

The thermal energy released by either hand grip 16, 18 is proportional to the amount of electrical energy that is supplied to it. Accordingly, by varying the duty cycle of the pulsed DC output signals 20, 22 a way is provided to provide variable adjustment capability to the heat output of the heated hand grips 16, 18.

The number of variable settings (i.e., different duty cycles) is a design variable that can vary from application to application, as well as from one version of the heated hand grip control 10 to another version.

To provide an optimum variable range without the burden of forcing an operator to forge through too many possible selections, a preferred setting is to use the coarse up and down buttons 40, 42 to provide five course settings, for example, a 20%, 40%, 60%, 80%, and maximum 100% duty cycle that is applied to either of the pulsed DC output signals 20, 22. Of course, more or less coarse settings are also possible.

It is also preferred to use the left and right grip buttons 44, 46 to fine tune the amount of overall energy (i.e., duty cycle) that is applied to either of the pulsed DC output signals 20, 22. Five fine settings are preferably provided intermediate each of the five coarse settings.

The right and left grip LEDs 38, 36 are preferably similarly energized in a pulsed output pattern that corresponds generally with the setting of each corresponding pulsed DC output signal 20, 22. Accordingly, the brighter the corresponding grip LED 38, 36, the higher is the duty cycle of the pulsed DC output signal 20, 22 to which it appertains.

It is also desirable to provide each grip LED 36, 38 with more than one color capability. Preferably, from green to red spectrum color capability are provided for each of the right and left grip LEDs 38, 36, as is well known. There is considerable variability in how the colors can be set to indicate the relative power settings of the heated hand grip control 10.

A preferred way is for each grip LED 36, 38 to illuminate at a brightest red color for a maximum or 100% duty cycle. Each progressively cooler setting corresponds with a progressive lowering of the duty cycle. The color of the affected grip LED (36 or 38) changes its color (hue) with each progressive lowering of the duty cycle. Preferably, a 50% duty cycle will cause the affected grip LED (36, or 38) to glow in an amber color (intermediate red and green).

The next possible lowering of the duty cycle causes the color of the grip LED (36, 38) to begin to shift slightly away from amber and toward a green color.

This progression continues until the coolest setting that is possible (either the lowest power setting possible or, if preferred completely off) is shown by a bright green LED 36, 38 for either the left grip Led 36 or the right grip LED 38.

Accordingly, the duty cycles of FIG. 3 can be used to energize either the red to amber to green portions of either of the LEDs 36, 38 to provide any desired visual indication of a duty cycle that is applied to a corresponding one of the pulsed DC outputs 20, 22.

If five coarse settings are provided and five fine settings are also possible intermediate each of the coarse settings for each of the pulsed DC outputs 20, 22, then a total of 25 settings are possible. Similarly, 25 variations from dark green to bright red are possible for each grip LED 36, 38.

If 25 settings are possible, the five coarse settings (20, 40, 60, 80, and 100%) can be varied in approximately four percent incremental changes in duty cycle. For example, it is possible to adjust the heated hand grip control 10 to provide a 4% output duty cycle, an 8% output cycle, a 12% output duty cycle, and so on up to a 100% duty cycle for either of the pulsed DC outputs 20, 22.

It is important to note that the setting for either of the pulsed DC outputs 20, 22 may be adjusted independent of the other, as is described in greater detail hereinafter.

The pulsed DC outputs 20, 22 are connected directly to an output of the microprocessor 32 or alternately to a power transistor (not shown) or to any other intermediate circuit component, as is well known in the electrical arts, in order to deliver a desired amount of electrical power without causing damage to the component or to the microprocessor 32. A preferred intermediate circuit component includes a MOSFET.

Preferably, a printed circuit board that includes the microprocessor 32, memory 34, buttons 40–46, grip LEDs 36, 38, and all other circuit components is provided in the enclosure 28.

The microprocessor 32 also monitors a positive VDC input 48 compared to a ground input 50 and verifies that the voltage differential is at least 12.75 VDC, which typically indicates a fully charged battery. If the voltage differential falls below 12.75 VDC, the heated hand grip control 10 shuts itself off and stops supplying any power to either of the heated grips 16, 18.

When the heated hand grip control 10 is used to control a motorcycle's heated grips 16, 18 (or other machine that includes the handlebar 14), the engine may have to be running and the charging system operating to maintain the battery 30 output at or above the required 12.75 volts.

Should a malfunction of the battery 30 or charging system occur the battery 30 will be drained and its output will soon fall below 12.75 VDC, at which time the heated hand grip control 10 will shut itself off. The resultant cold hands will provide tactile feedback sufficient to inform the operator of the electrical failure.

The heated hand grip control 10 preferably does not include an "on-off" control, although it certainly could. When the motorcycle (or other machine) is turned off, the battery 30 stops being charged and the output voltage soon drops to below 12.75 volts, still indicative of a full charge for the battery 30, but not that which would normally occur while the motorcycle engine was running. The heated hand grip control 10 senses the drop in battery voltage (the differential between the positive VDC input 48 and the ground input 50) to 12.75 VDC and shuts the unit off (or puts it into a low current draw quiescent state) after storing the last settings in the memory 34.

When any button 40–46 is momentarily depressed, the heated hand grip control 10 detects the depression and automatically restores both the right and left heated grips 16, 18 to their last settings by resuming the duty cycle that was present prior to shut down of the heated hand grip control 10 at each of the two pulsed DC outputs 20, 22. Both LEDs 36, 38 are illuminated accordingly.

If the operator wants both of the heated grips to experience a proportional increase in temperature, the coarse up button 40 is depressed and released one time. Both LEDs 36, 38 will experience the same coarse magnitude change in brightness or color to indicate that the same change has occurred for both the right and left sides.

However, any differential in duty cycle between the two pulsed DC outputs 20, 22 that was there previously will remain after depressing the coarse up button 40, or alternately the coarse down button 42.

If the right pulsed DC output 20 was previously at a 40% duty cycle and the left pulsed DC output 22 was previously at a 36% duty cycle, then one depression of the coarse up button 40 will raise the duty cycle of the right pulsed DC output to 60% and it will also raise the duty cycle of the left pulsed DC output 22 to 56%, thereby preserving the same magnitude of temperature (energy) differential between the right and left heated grips 16, 18.

This permits the operator to compensate for changes in ambient temperatures while still preserving optimum comfort for both the right and left hands. The operator's own preferences, which takes into account a combination of all other factors such as the normal position of the right and left hands, rate of heat loss from each hand, thermal conductivity of each hand, etc. once set in the form of an energy differential between the right and left hands is maintained unless the operator deliberately changes the differential.

To increase in coarse increments the duty cycle of both the right and the left heated grips 16, 18, the coarse up button 40 is repeatedly depressed and released a desired number of times, up to the maximum range in coarse adjustment. The temperature of both heated grips 16, 18 are simultaneously increased a proportionate amount for each depression of the coarse up button 40. The two LEDs 36, 38, in tandem, reflect that proportionate increase in temperature.

Conversely, to make coarse adjustments that proportionally cool both grips 16, 18 while still preserving the differential between them, the coarse down button 42 is repeatedly depressed and released until the desired setting is obtained. The two LEDs 36, 38, in tandem, reflect that proportionate decrease in temperature.

To change the differential between the right and left hands, a number of design options are possible. A preferred way to change the differential is by repeatedly depressing and releasing either the left grip button 44 or the right grip button 46 to increase the duty cycle for the one that is being repeatedly pressed and released, as compared to the one that is not.

If, for example, it is desired to increase the temperature (i.e., the duty cycle) of the left side heated hand grip 18 as compared to that of the right side heated hand grip 16, the left grip button 44 is repeatedly depressed and released.

The differential is thereby increased whereby the duty cycle for the left grip 18 is increased and the duty cycle for the right grip 16 is decreased for each depression and release. The left grip LED 36 will incrementally color shift toward the red while the right grip LED 38 will incrementally color shift toward the green, thereby indicating that the differential has shifted between the left grip 18 and the right grip 16 in such a manner that the left grip 18 is now warmer with respect to the right grip 16 than it was before the first repeated depression and release of the left grip button 44.

Additional similar repeated depressions will proportionately increase the duty cycle of the left grip 18 (and its temperature) with respect to the right grip 16. The left grip LED 36 will also continually incrementally color shift toward the red while the right grip LED 38 will incrementally color shift toward the green for each subsequent depression and release of the left grip button 44.

If at any time the left grip 18 is already at a 100% duty cycle and therefore maximally warm, it is not possible to increase the duty cycle of the left grip 18 or to color shift the left grip LED 36 further toward the red end of the spectrum when it already is fully red. If this is the situation and the left grip button 44 is repeatedly depressed and released, this input command by the user is still interpreted as one that is intended to increase the differential between the left grip 18 making it warmer when compared to the right grip 16.

The only way to do this when the left grip 18 is at a 100% duty cycle is maintain the left grip 18 at its 100% duty cycle and to proportionately lower the duty cycle of the right grip 16 from wherever it is for each repeated depression and release of the left grip button 44. This process can be repeated until a desired differential is attained. The left grip LED 36, in this example, would stay red while the right grip LED 38 would incrementally shift toward the green for each subsequent depression and release of the left grip button 44. Of course, a maximum differential possible would be attained when the left grip 18 is at 100% duty cycle and with a fully red left grip LED 36 to indicate this state and the right grip 16 at 0% duty cycle (off) with the right grip LED 38 fully green.

If it is desired to increase the temperature (duty cycle) of the right grip 16 as compared to that of the left grip 18, the process described above is mirrored for repeated depressions and releases of the right grip button 46.

After establishment of the proper differential between the left grip 18 and the right grip 16, if the overall temperature setting of both is not proper, the coarse up button 40 and the coarse down button 42 are then used to either raise or lower the overall temperature for each grip 16, 18 respectively while preserving any differential that was previously established and set.

Other program options for creating a differential between the right 16 and left grip 18 are certainly possible. For example, although not preferred operation of the microprocessor 32 can be modified (by program change), whereby either the left grip button 44 or the right grip button 42 is first initially depressed and released one time. The operator then momentarily depresses and releases either the coarse up button 40 or the coarse down button 42 repeatedly to make fine adjustments in the corresponding duty cycle for the side that was first selected. This process can continue to introduce any magnitude of offset between the duty cycle that is applied to the right and left sides. Either side can be made (i.e., set to) hotter or cooler, by any of the possible twenty-five settings (or other amount) as previously described.

If, to continue description of this modification, the operator wishes to further warm the left heated grip 18 and to further cool the right heated grip 16, the operator may elect to first depress the left grip button 44 thereby selecting the left heated grip 18 and the left pulsed DC output 22 to first adjust. The operator would then repeatedly depress and release the coarse up button 40 which would now make fine adjustments (i.e. 4%) for each depression in the duty cycle of only the left pulsed DC output. The right pulsed DC output 20 is not affected.

To further cool, according to this modification for example, the right heated grip 16, the operator would then depress the right grip button 46 and then repeatedly depress and release the coarse down button 42 which, in this mode, would now make fine adjustments (i.e., 4%) that decrement the duty cycle that is applied to the right pulsed DC output 20.

Accordingly, any differential between the duty cycle of the energy applied to the heated grips 16, 18 may be set. After selecting the left or right grip buttons 44, 46 for adjustment and after a short timeout without further input from the coarse buttons 40, 46, the coarse buttons 40, 46 resume their primary function in providing coarse (i.e., 20%) adjustment of the overall duty cycle that is applied simultaneously to both heated grips 16, 18.

The left LED 36 and right LED 38 always reflect, by a combination of color and brightness, the duty cycle of the left pulsed DC output 22 and the right pulsed DC output 20, respectively. The operator is always able to tell by a glance of the LEDs 36, 38 on the control panel 12 the setting that each heated grip 16, 18 is set to.

Reverse polarity protection is provided in the enclosure 28 on the printed circuit board to ensure that if the operator reverses polarity of the ground input 50 and the positive voltage DC input 48, no harm occurs.

An alternate way to shut the heated hand grip control 10 off (both sides) is by depressing and holding the coarse down button 42 in a depressed state for at least three seconds. The previous settings of both the left and right heated grips 18, 16 (i.e., the duty cycles that were applied to the left and right pulsed DC outputs 22, 20) are maintained in memory 34 and are restored when any button 40–46 is later again depressed and quickly released.

The heated hand grip control 10 may be factory installed on new motorcycles or it may be retrofitted to virtually all previously existing motorcycles. While a description of the preferred embodiment used a motorcycle to illustrate the features and benefits of the heated hand grip control 10, it may be used on any machine or device that includes the handlebar 14. It is also noted that the handlebar 14 does not have to be a "one-piece" contiguous unit. As long as a right hand of the operator grips a right side and a left hand of the operator grips a left side of the device, the heated hand grip control 10 is applicable to precisely regulate the heat that is applied individually to both the right and left hands simultaneously.

A convenient way is provided by the heated hand grip control 10 to precisely control the amount of heat that is applied to the right heated grip 16 independent of the heat that is applied to the left heated grip 18. A minimum of control inputs (i.e., the four input buttons 40–46) allow for easy on-off control and setting of the desired temperatures of each heated grip 16, 18.

It is noted that the coarse up button 40 and the coarse down button 42 provide coarse adjustment when they are used by themselves. In that mode, the coarse up and down buttons 40, 42 simultaneously adjust the duty cycle in a coarse manner (i.e., +/−20% per cycle) that is applied to both the right and left grips 16, 18.

However, if either the left grip button 44 or the right grip button 46 is first depressed and released, then the coarse up and down buttons 40, 42 change their mode of function by independently adjusting the duty cycle in a finer manner (i.e., +/−4% per cycle) that is applied to either the right or left grip 16, 18, depending upon which grip button 44, 46 was depressed first, and not by adjusting both of the grips 16, 18 at the same time.

Referring again to FIG. 1, a small amount of heat 52 is shown rising off from the right heated grip 16 and a large amount of heat 54 is shown rising off from the left heated grip 18. This illustrates the ability of the heated hand grip control 10 to independently control the right heated grip 16 and the left heated grip 18 apart from each other.

When the heated hand grip control 10 powers off, the duty cycle of each grip 16, 18 and therefore the differential setting are retained in the memory 34 and are restored when the heated hand grip control 10 is activated by a depression of any button 40–46.

Figures 4, 4A:
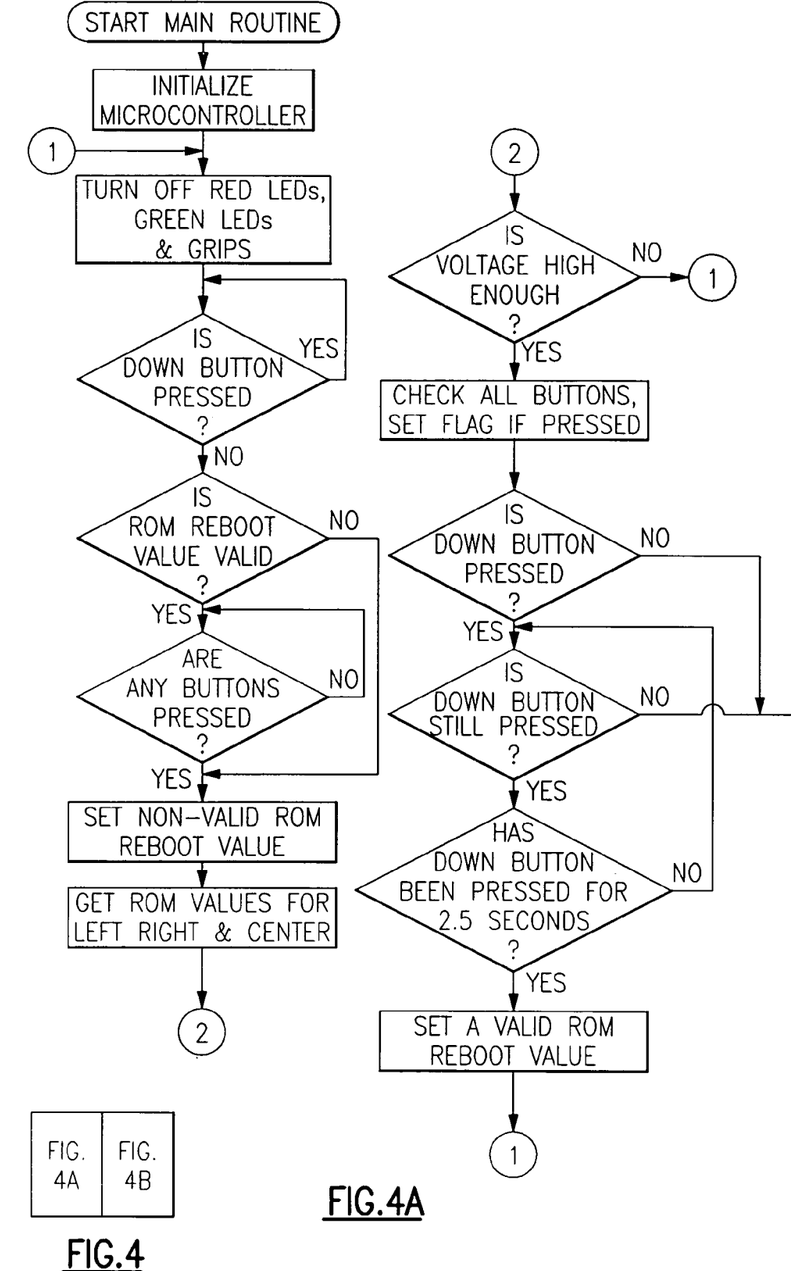
FIG. 4 is a flowchart of a main routine.
Figure 4B:
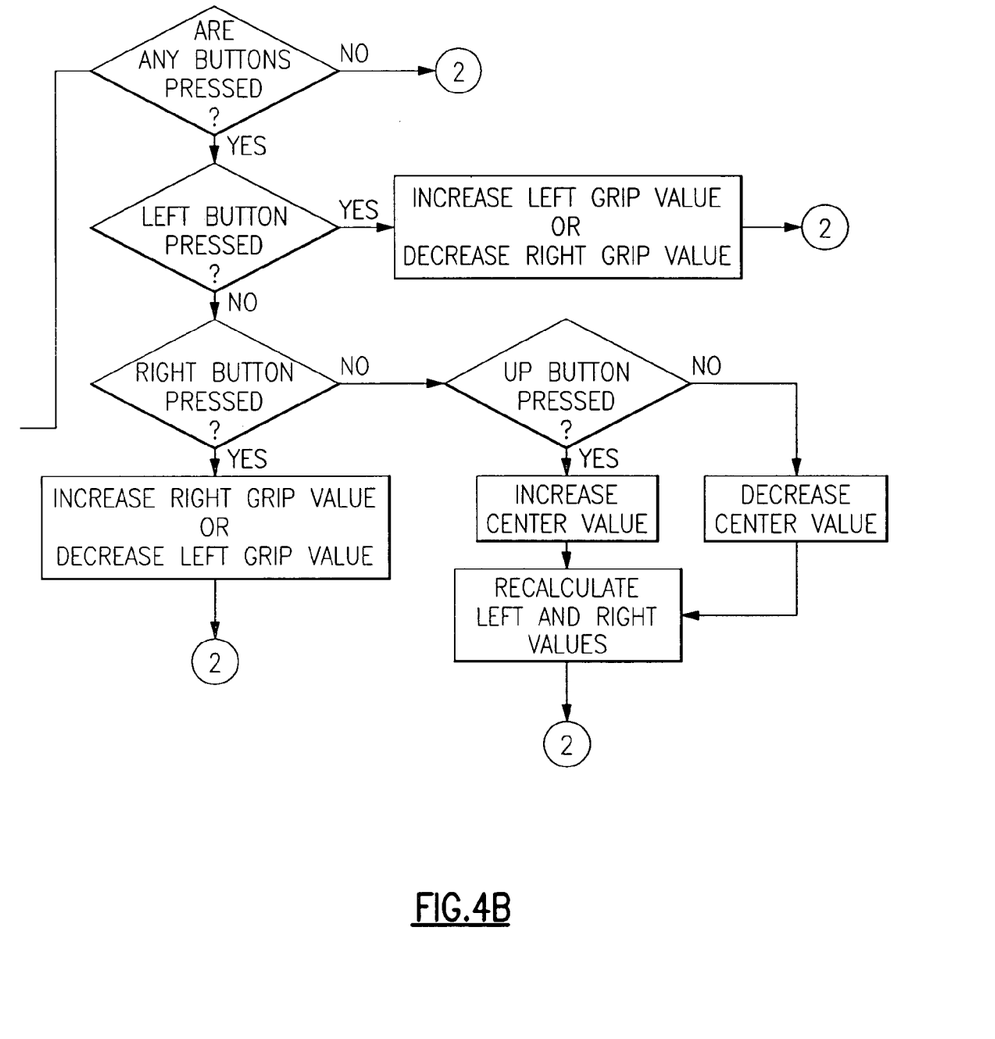
Figure 5:
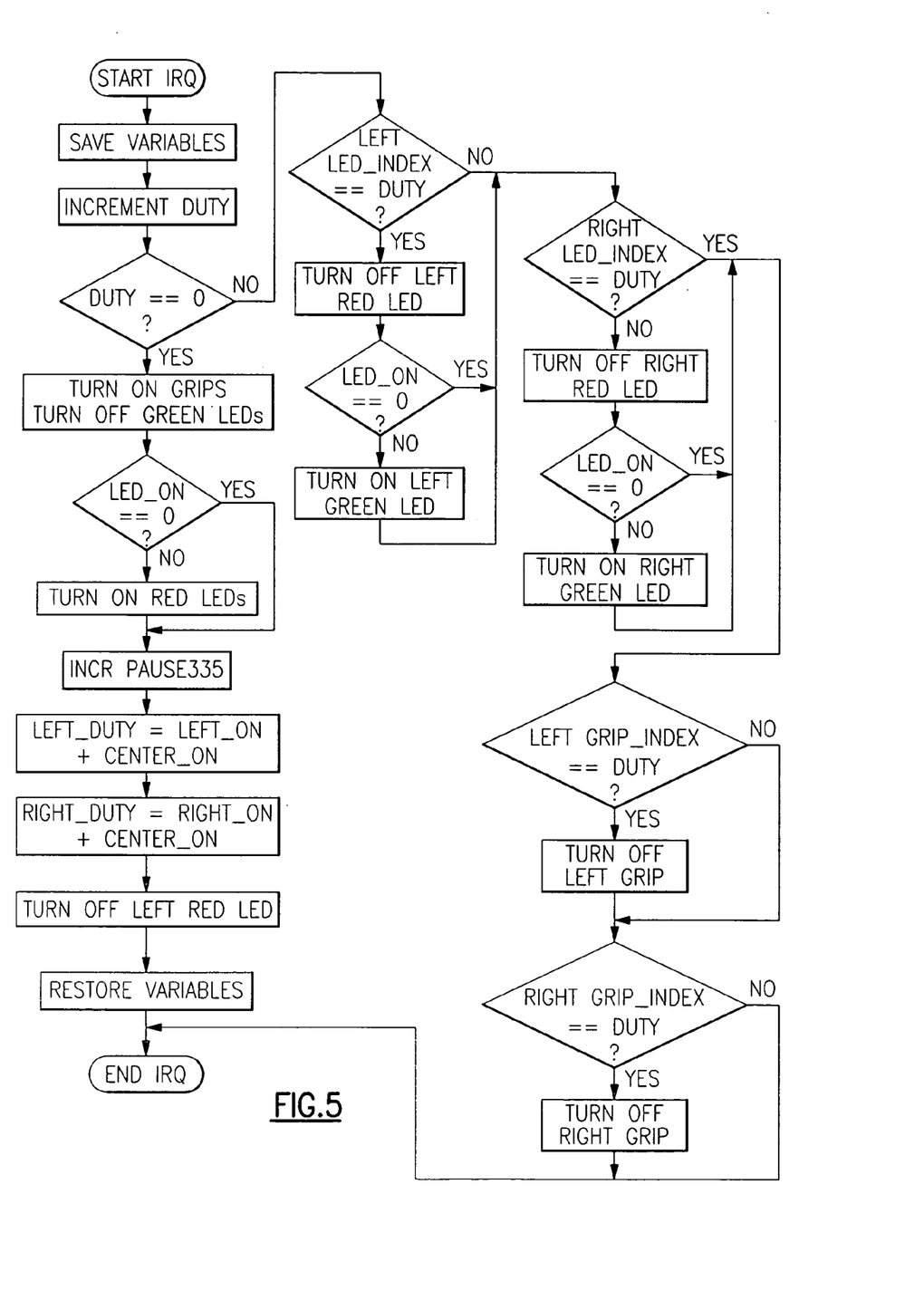
FIG. 5 is a flowchart of an interrupt routine of the heated hand grip control of FIG. 1.

FIG. 4 is one possible flowchart of a main routine, and FIG. 5 is one possible flowchart of an interrupt routine of the heated hand grip control 10.

Figure 6:
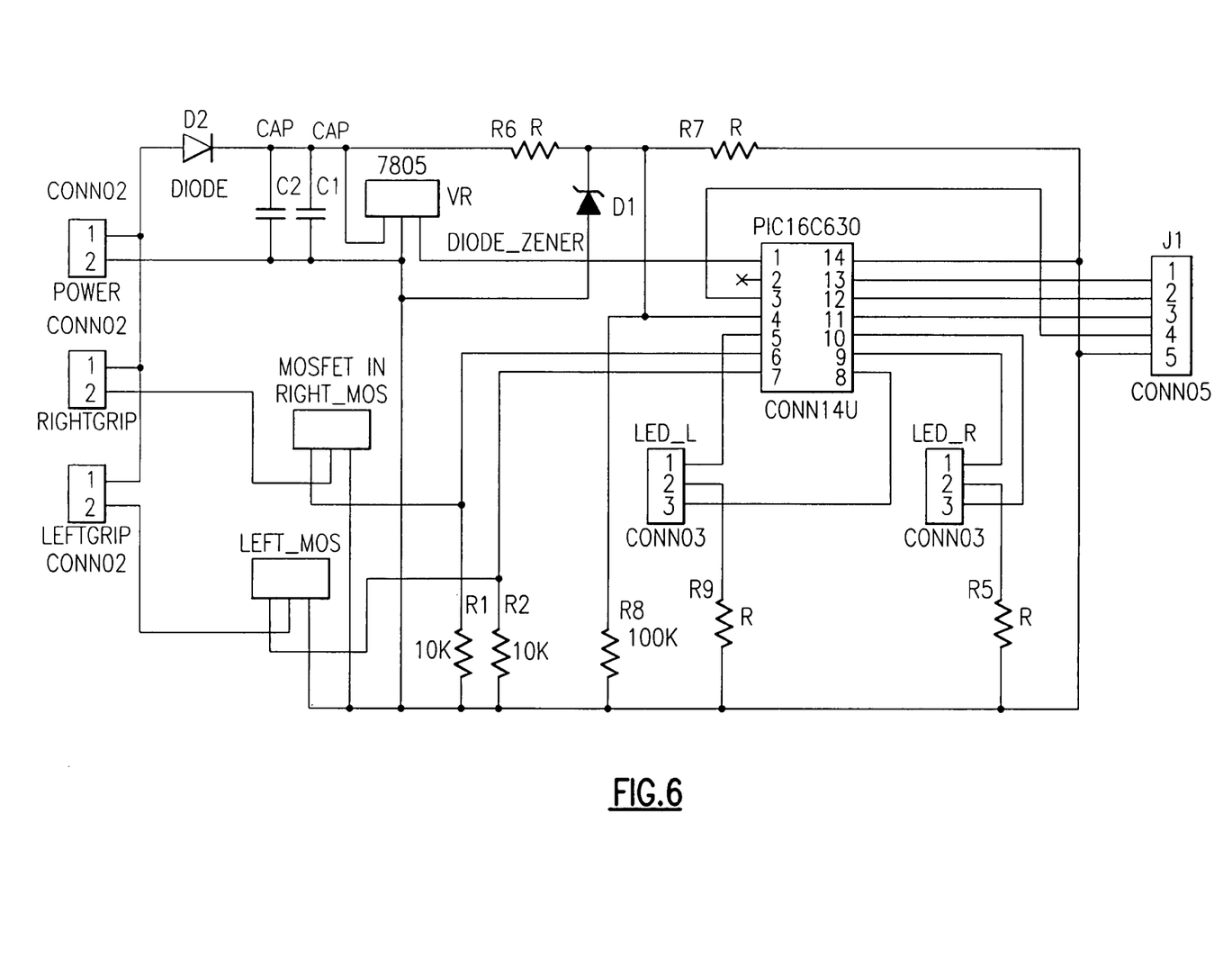
FIG. 6 is a schematic of the heated hand grip control of FIG. 1.

FIG. 6 is a possible schematic of the heated hand grip control of the heated hand grip control 10.

The invention has been shown, described, and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. A heated hand grip, comprising:
   (a) means for restoring an amount of electrical energy that was supplied to said heated right grip and an amount of electrical energy that was supplied to said heated left grip that is equal in magnitude of that supplied during a last previous use thereof during a new use of said heated hand grip control, said new use occurring after a quiescent period in which no electrical energy was supplied to either said heated right grip or said heated left grip during said quiescent period;
   (b) means for shutting said heated hand grip control off wherein no electrical energy is supplied to either said heated right grip or said heated left grip subsequent to a detection by said means for shutting said heated hand grip control off that a voltage of a battery has fallen to a predetermined level;
   (c) first means for controlling a first amount of electrical energy that is supplied to said heated right grip and second means for controlling a second amount of electrical energy that is supplied to said heated left grip;
   (d) wherein said first means for controlling includes first means for varying a duty cycle of an electrical waveform that is applied to said heated right grip and wherein said second means for controlling includes means for varying a duty cycle of an electrical waveform that is applied to said heated left grip; and
   (e) including a microprocessor, said microprocessor including a memory that is in electrical communication with said microprocessor, and including a control panel having a plurality of inputs that are electrically connected to said microprocessor and a plurality of outputs that are electrically connected to said microprocessor, and wherein said plurality of outputs includes a first pulsed DC output that is adapted for connection to said heated right grip and wherein said plurality of outputs includes a second pulsed DC output that is adapted for connection to said heated left grip.

2. The heated hand grip of claim 1 including means for supplying an amount of electrical energy to said heated right grip that is different than an amount of electrical energy that is supplied to said heated left grip during said new use thereof.

3. The heated hand grip claim 1 wherein said first amount of electrical energy is different than said second amount of electrical energy.

4. The heated hand grip of claim 1 wherein said first means for controlling includes means for varying a duty cycle of an electrical waveform that is applied to said heated right grip.

5. The heated hand grip of claim 1 wherein said second means for controlling includes means for varying a duty cycle of an electrical waveform that is applied to said heated left grip.

6. The heated hand grip of claim 1 wherein said first means for varying a duty cycle of an electrical waveform includes means for varying the duty cycle of said first pulsed DC output.

7. The heated hand grip of claim 1 wherein said second means for varying a duty cycle of an electrical waveform includes means for varying the duty cycle of said second pulsed DC output.

8. The heated hand grip of claim 1 wherein said plurality of outputs includes a first LED that is adapted to indicate a relative magnitude of said duty cycle of said electrical waveform that is applied to said heated right grip.

9. The heated hand grip of claim 1 wherein said plurality of outputs includes a second LED that is adapted to indicate a relative magnitude of said duty cycle of said electrical waveform that is applied to said heated left grip.

10. The heated hand grip of claim 1 wherein said plurality of inputs includes a coarse up momentary switch and a coarse down momentary switch that are each electrically connected to a corresponding input of said microprocessor.

11. The heated hand grip of claim 10 wherein subsequent to a depression and release of said coarse up momentary switch, said microprocessor is adapted to increase said duty cycle of said first pulsed DC output and said second pulsed DC output by a corresponding amount.

12. The heated hand grip of claim 10 wherein said first pulsed DC output includes a first duty cycle and said second pulsed DC output includes a second duty cycle and wherein a differential exists between said first duty cycle and said second duty cycle and wherein subsequent to a depression and release of said coarse up momentary switch, said microprocessor is adapted to increase said duty cycle of said first pulsed DC output and said second pulsed DC output by a corresponding amount whereby a revised first duty cycle is provided that is greater than said first duty cycle and a revised second duty cycle is simultaneously provided that is greater than said second duty cycle.

13. The heated hand grip of claim 12 wherein said differential is maintained between said revised first duty cycle and said revised second duty cycle.

14. The heated hand grip of claim 10 wherein subsequent to a depression and release of said coarse down momentary switch, said microprocessor is adapted to decrease said duty cycle of said first pulsed DC output and said second pulsed DC output by a corresponding amount.

15. The heated hand grip control of claim 10 wherein said first pulsed DC output includes a first duty cycle and said second pulsed DC output includes a second duty cycle and wherein a differential exists between said first duty cycle and said second duty cycle and wherein subsequent to a depression and release of said coarse down momentary switch, said microprocessor is adapted to decrease said duty cycle of said first pulsed DC output and said second pulsed DC output by a corresponding amount whereby a revised first duty cycle is provided that is less than said first duty cycle and a revised second duty cycle is simultaneously provided that is less than said second duty cycle.

16. The heated hand grip of claim 15 wherein said differential is maintained between said revised first duty cycle and said revised second duty cycle.

17. The heated hand grip of claim 10 wherein said plurality of inputs includes a left grip momentary switch, and a right grip momentary switch that are each electrically connected to a corresponding input of said microprocessor.

18. The heated hand grip of claim 17 wherein subsequent to a depression and release of said right grip momentary switch, a first duty cycle of said first pulsed DC output is enabled for change relative to a second duty cycle of said second pulsed DC output, and wherein subsequent to a further depression and release of either said coarse up momentary switch or said coarse down momentary switch, a change in said first duty cycle as compared to said second duty cycle is effected by increasing or decreasing said first duty cycle as compared to said second duty cycle.

19. The heated hand grip of claim 18 wherein said change in said first duty cycle includes a small magnitude of change.

20. The heated hand grip of claim 17 wherein subsequent to a depression and release of said left grip momentary switch, a second duty cycle of said second pulsed DC output is enabled for change relative to a change of a first duty cycle of said first pulsed DC output, and wherein subsequent to a further depression and release of either said coarse up momentary switch or said coarse down momentary switch, a change in said second duty cycle relative to said first duty cycle is effected by increasing or decreasing said second duty cycle as compared to said first duty cycle.

21. The heated hand grip of claim 20 wherein said change in said second duty cycle includes a small magnitude of change.

22. The heated hand grip of claim 10 wherein said heated hand grip control is adapted to turn itself off subsequent to a depression of said coarse down momentary switch when said depression of said coarse down momentary switch is maintained for a predetermined period of time.

23. The heated hand grip of claim 10 wherein said plurality of inputs includes a ground input from a battery that is electrically connected to said heated hand grip control and a positive voltage input from said battery, and wherein a differential in voltage is detected by said microprocessor intermediate said ground input and said positive voltage input, and wherein subsequent to a decrease in the magnitude of said differential in voltage to a predetermined magnitude, said heated hand grip control is adapted to turn itself off sufficient to reduce an amount of electrical energy that supplied to said first pulsed DC output and to said second pulsed DC output to substantially zero.

24. The heated hand grip of claim 1 including means for providing an indication of said first amount of electrical energy.

25. The heated hand grip of claim 24 wherein said means for providing an indication of said first amount of electrical energy includes a right grip LED.

26. The heated hand grip of claim 25 wherein said right grip LED includes a color shifting type of LED.

27. The heated hand grip of claim 25 wherein said right grip LED includes a color or brightness that is proportional to said first amount of electrical energy.

28. The heated hand grip control of claim 1 including means for providing an indication of said second amount of electrical energy.

29. The heated hand grip of claim 28 wherein said means for providing an indication of said second amount of electrical energy includes a left grip LED.

30. The heated hand grip of claim 29 wherein said left grip LED includes a color shifting type of LED.

31. The heated hand grip of claim 29 wherein said left grip LED includes a color or brightness that is proportional to said second amount of electrical energy.

32. The heated hand grip control of claim 1 including means for retaining said in memory an indication of said first amount of electrical energy and an indication of said second amount of electrical energy and wherein said memory is preserved when said heated hand grip control enters a quiescent state and wherein when said heated hand grip control exits from said quiescent state and enters an active state said first amount of electrical energy and said second amount of electrical energy are restored to said right and left grip subsequent to a command supplied to said heated hand grip control.

33. A method for controlling thermal output of a heated right grip and thermal output of a heated left grip on a handlebar independent of one another, comprising the steps of:

(a) providing means for restoring an amount of electrical energy that was supplied to said heated right grip and an amount of electrical energy that was supplied to said heated left grip that is equal in magnitude of that supplied during a last previous use thereof during a new use of said heated hand grip control, said new use occurring after a quiescent period in which no electrical energy was supplied to either said heated right grip or said heated left grip during said quiescent period;

(b) providing means for shutting said heated hand grip control off wherein no electrical energy is supplied to either said heated right grip or said heated left grip subsequent to a detection by said means for shutting said heated hand grip control off that a voltage of a battery has fallen to a predetermined level;

(c) providing first means for controlling a first amount of electrical energy that is supplied to said heated right grip and second means for controlling a second amount of electrical energy that is supplied to said heated left grip;

(d) wherein said first means for controlling includes first means for varying a duty cycle of an electrical waveform that is applied to said heated right grip and wherein said second means for controlling includes means for varying a duty cycle of an electrical waveform that is applied to said heated left grip; and (e) including a microprocessor, said microprocessor including a memory that is in electrical communication with said microprocessor, and including a control panel having a plurality of inputs that are electrically connected to said microprocessor and a plurality of outputs that are electrically connected to said microprocessor, and wherein said plurality of outputs includes a first pulsed DC output that is adapted for connection to said heated right grip and wherein said plurality of outputs includes a second pulsed DC output that is adapted for connection to said heated left grip.

34. The method of claim 33 including the further step of setting said first level to an amount of electrical energy that is different than said second level.

* * * * *